United States Patent
Hernandez Vasquez et al.

(10) Patent No.: US 12,356,983 B2
(45) Date of Patent: Jul. 15, 2025

(54) GELLED HYDRATION MEDIUM

(71) Applicant: Enhold B.V., Naarden (NL)

(72) Inventors: Geraldine Paola Hernandez Vasquez, Naarden (NL); Bart Arnoldus Wilhelmus Dings, Naarden (NL); Wilhelmus Johannes Leonardus Arts, Naarden (NL)

(73) Assignee: ENHOLD B.V., Naarden (NL)

( * ) Notice: Subject to any disclaimer, the term of this patent is extended or adjusted under 35 U.S.C. 154(b) by 579 days.

(21) Appl. No.: 17/852,109

(22) Filed: Jun. 28, 2022

(65) Prior Publication Data

US 2022/0322619 A1    Oct. 13, 2022

Related U.S. Application Data

(63) Continuation of application No. PCT/EP2020/088054, filed on Dec. 30, 2020.

(30) Foreign Application Priority Data

Dec. 31, 2019    (EP) .................................... 19220216

(51) Int. Cl.
| | |
|---|---|
| *A01N 3/02* | (2006.01) |
| *A01G 2/10* | (2018.01) |
| *A01G 24/35* | (2018.01) |
| *A01N 25/04* | (2006.01) |
| *A01N 59/06* | (2006.01) |

(52) U.S. Cl.
CPC ............... *A01N 3/02* (2013.01); *A01N 25/04* (2013.01); *A01N 59/06* (2013.01); *A01G 2/10* (2018.02); *A01G 24/35* (2018.02)

(58) Field of Classification Search
None
See application file for complete search history.

(56) References Cited

FOREIGN PATENT DOCUMENTS

| CN | 104987229 A | | 10/2015 | | |
|---|---|---|---|---|---|
| CN | 106973891 A | * | 7/2017 | ............... | A01N 3/00 |
| EP | 4084611 B1 | * | 12/2024 | ............... | A01N 3/02 |
| JP | 2004-315449 A | | 11/2004 | | |
| WO | WO-99/55154 | | 11/1999 | | |
| WO | WO-2009/134118 A1 | | 11/2009 | | |
| WO | WO-2015/097074 A1 | | 7/2015 | | |
| WO | WO-2015150903 A1 | * | 10/2015 | ............... | C05D 9/00 |
| WO | WO-2018/125933 A1 | | 7/2018 | | |

OTHER PUBLICATIONS

Machine translation of CN 106973891 (Jul. 25, 2017).*
Database WPIWeek 200482 Thomson Scientific, London, GB;AN 2004-825140 & JP 2004 315449 A (Kao Corp) Nov. 11, 2004 (2 pages).
Database WPIWeek 201619 Thomson Scientific, London, GB;AN 2016-122854 & CN 104987229 A (Jiang W) Oct. 21, 2015 (2 pages).
International Search Report and Written Opinion issued for PCT Appl. Ser. No. PCT/EP2020/088054 dated Mar. 3, 2021 (11 pages).

* cited by examiner

Primary Examiner — John Pak
(74) Attorney, Agent, or Firm — Foley & Lardner LLP

(57) ABSTRACT

The invention provides a flower shipment kit comprising:
  a container holding an aqueous flower gel; and
  one or more cut flowers whose stems are immersed in the aqueous flower gel;
  wherein the aqueous flower gel comprises (i) 1-4 wt. % of disc-shaped smectite clay nanoparticles having two opposing flat surfaces that are negatively charged and a rim that is positively charged, and (ii) 0.01-250 mM of one or more gel destabilizing agents selected from acidulants, dissolved metal cations and dissolved ammonium cations.

The flower gel of the present invention slowly releases water over time in a way that enables cut flowers to take it up immediately.

The invention also relates to a kit of parts for preparing a gelled hydration medium and to a method of preparing such a gelled hydration medium.

14 Claims, No Drawings

GELLED HYDRATION MEDIUM

CROSS-REFERENCE TO RELATED APPLICATIONS

The present application is a continuation application of PCT/EP2020/088054 filed Dec. 30, 2020, which claims priority to EP 19220216.6 filed Dec. 31, 2019 the entire contents of both which are incorporated herein by reference.

TECHNICAL FIELD OF THE INVENTION

The present invention relates to a gel that can advantageously be used as a hydration medium for cut flowers, e.g. during transportation of cut flowers. The hydration medium comprises (i) disc-shaped smectite clay nanoparticles having two opposing flat surfaces that are negatively charged and a rim that is positively charged, and one or more gel destabilizing agents selected from acidulants, dissolved metal cations and dissolved ammonium cations.

The invention also relates to a kit of parts for preparing a gelled hydration medium and to a method of preparing such a gelled hydration medium.

BACKGROUND OF THE INVENTION

The importance of preserving cut flowers continues to increase with the growing consumer demand for flowers from around the world. Florists have to provide an ever increasing variety of non-indigenous and out of season flowers, from around the world. Preservation of cut flowers during transport enables the flowers to look fresh at arrival and ensures longer enjoyment of flowers by customers after transport, regional wholesaling, and retail display.

One requirement for preservation of most cut flowers is water. Many cut flowers quickly lose turgidity and wilt without a ready supply of water at the cut stem. It is common practice to increase the attractive life of the flowers by keeping cut stems in water.

However, transportation of cut flowers in water is associated with a number of issues. The presence of liquids in flower shipments has been restricted by many transporters. During transport, water spillage may occur or holders containing water and cut flowers may fall over. Furthermore, bacteria and moulds, such as *botrytis*, can freely develop and spread through the water. A further disadvantage is that transportation in water requires the cut flowers to be transported vertically, which means that more space is required. This in turn raises the transport costs.

It is known in the art to address the aforementioned issued by transporting cut flowers with their stems immersed in an aqueous gel, i.e. a flower gel.

WO 99/55154 describes a method of preserving cut flowers, wherein the cut flowers are placed with their stems into a holder, which holder is provided with a bottom and contains aqueous gel as medium, and the gel is prepared by allowing granules of a water absorbent cross-linked polymer to swell, characterized in that the stems are inserted into a gel on polyacrylamide basis, in which the size of the dry granules is 0.2 mm or smaller.

WO 2018/125933 describes a system for preserving cut plants, the system comprising:
a media container;
a gel media at a bottom of the container, said gel media comprising a hydrophilic gel selected from the group consisting of: a polyacrylamide and an agarose; and,
a liquid media layer above the gel media in the container.

JP 2004 315449 describes a cut flower set comprising a cut flower, a water-absorbent support that comes into contact with the cut end of the cut flower, and a cut flower freshness preserving agent.

A problem associated with the transportation of cut flowers in flower gels is insufficient water uptake and early wilting. The water present in aqueous flower gels is strongly bound by the gel matrix and largely unavailable for uptake by the cut flowers.

SUMMARY OF THE INVENTION

The inventors have developed a flower gel that slowly releases water over time in a way that enables cut flowers to take it up immediately. Thus, the present invention provides the known benefits of flower gels, but unlike the flower gels of the prior art it does not have a negative effect on the longevity of cut flowers.

The flower gel of the present invention comprises disc-shaped smectite clay nanoparticles having two opposing flat surfaces that are negatively charged and a rim that is positively charged. When dispersed in water, due to the peculiar charge distribution on the particle surface, the smectite clay nanoparticles can form a gel matrix that traps water. This gel matrix becomes liquid upon application of shear and recovers its gel state when shear is long applied, i.e. it shows thixotropic behaviour.

The inventors have unexpectedly discovered that addition of protons, metal cations and/or ammonium cations causes the smectite clay gel to slowly release water whilst retaining its gel character. This phenomenon can advantageously be used to ensure adequate water supply to cut flowers during transport. Addition of an adequate amount of acidulant and/or water-soluble metal/ammonium salt to a smectite clay gel initiates a slow gel destabilization process that makes water available for uptake by cut flowers.

Thus, the present invention provides a flower shipment kit comprising:
a container holding an aqueous flower gel; and
one or more cut flowers whose stems are immersed in the aqueous flower gel;
wherein the aqueous flower gel comprises (i) 1-4 wt. % of disc-shaped smectite clay nanoparticles having two opposing flat surfaces that are negatively charged and a rim that is positively charged, and (ii) 0.01-250 mM of one or more gel destabilizing agents selected from acidulants, dissolved metal cations and dissolved ammonium cations.

The flower gel of the present invention does not utilize synthetic gelling polymers, such as polyacrylamide, whose disposal may be associated with environmental issues.

Also provided by the present invention is the use of the aforementioned aqueous flower gel as a water-supplying medium for cut flowers.

The invention further provides a kit of parts comprising:
a first container comprising a thixotropic aqueous gel comprising 1-4 wt. % of disc-shaped smectite clay nanoparticles having two opposing flat surfaces that are negatively charged and a rim that is positively charged;
a second container comprising an aqueous liquid comprising 0.001-30 M of one or more destabilizing agents selected from acidulants, dissolved metal cations and dissolved ammonium cations; and/or 0.1-70 wt. % of nutrients.

The aforementioned kit can suitably be used to prepare a hydration medium, such as a flower gel, as and when it is needed. Different types of hydration media may be prepared by varying the ratio in which the thixotropic aqueous gel from the first container and the aqueous liquid from the second container are mixed. Different hydration media may also be prepared by employing aqueous liquids of different composition (e.g. an aqueous liquid containing a destabilizing agent and/or an aqueous liquid containing nutrients). When the aqueous liquid contains a component that destabilizes the thixotropic aqueous gel that is contained in the first container, the present kit offers the advantage that destabilization does not already occur before the hydration medium is actually used.

Further provided is a method of preparing a gelled hydration medium, said method comprising:
providing a thixotropic aqueous gel comprising 1-4 wt. % of disc-shaped smectite clay nanoparticles having two opposing flat surfaces that are negatively charged and a rim that is positively charged;
providing an aqueous liquid comprising 0.001-30 M of one or more destabilizing agents selected from acidulants, dissolved metal cations and dissolved ammonium cations; and/or 0.1-70 wt. % of nutrients; and
mixing the thixotropic aqueous gel and the aqueous liquid.

The present method offers the advantage that due to the thixotropic nature of the aqueous gel ingredients such as the aforementioned destabilizing agents, but also other components, such as nutrients, can be introduced to form a hydration medium that is ready for use. This provides the end user with the flexibility to formulate the hydration medium according to his/her needs.

DETAILED DESCRIPTION OF THE INVENTION

Accordingly, a first aspect of the invention relates to a flower shipment kit comprising:
a container holding an aqueous flower gel; and
one or more cut flowers whose stems are immersed in the aqueous flower gel; wherein the aqueous flower gel comprises (i) 1-4 wt. % of disc-shaped smectite clay nanoparticles having two opposing flat surfaces that are negatively charged and a rim that is positively charged, and (ii) 0.01-250 mM of one or more gel destabilizing agents selected from acidulants, dissolved metal cations and dissolved ammonium cations.

The term "acidulant" as used herein encompasses both organic and mineral acids. In the aqueous compositions described herein, acidulant may be present in different protonation states. For example citric acid may be present in the following forms:

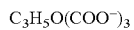

$C_3H_5O(COO^-)_3$

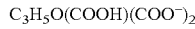

$C_3H_5O(COOH)(COO^-)_2$

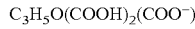

$C_3H_5O(COOH)_2(COO^-)$

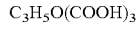

$C_3H_5O(COOH)_3$

The aqueous flower gel of the present invention preferably comprises 1.2-3.5 wt. % of the disc-shaped smectite clay nanoparticles, more preferably 1.5-3.0 wt. % of the disc-shaped smectite clay nanoparticles and most preferably 1.8-2.5 wt. % of the disc-shaped smectite clay nanoparticles.

The smectite clay nanoparticles employed in accordance with the present invention preferably contain (on a dry basis) 58-61 wt. % $SiO_2$; 26-29 wt. % MgO; 0.6-1.0% $Li_2O$ and 2.4-3.1 wt. % $Na_2O$.

Preferably, the smectite clay is a layered hydrous magnesium silicate belonging to the family of (2:1) phyllosilicates and is built up of sheets of octahedrally coordinated magnesium oxide sandwiched between two parallel sheets of tetrahedrally coordinated silica.

According to a particularly preferred embodiment, the smectic clay is a natural or synthetic phyllosilicate of idealized formula $Na^+{}_{0.7}[(Si_8Mg_{5.5}Li_{0.3})O_{20}(OH)_4]^-{}_{0.7}$ (e.g. Laponite).

Aqueous smectite gels are by nature strongly basic (pH 10). The inventors have found that acidulants can suitably be used to destabilize aqueous smectite gels and to cause a sustained release of water than can be absorbed by the stems of cut flowers. Accordingly, in a preferred embodiment, the aqueous flower gel of the present invention preferably has a pH in the range of 6 to 9, more preferably in the range of 6.5 to 8.5, more preferably in the range of 7 to 8 and most preferably in the range of 7.2 to 7.8.

The aqueous flower gel preferably comprises 0.1-100 mM, more preferably 0.2-60 mM and most preferably 0.3-30 mM of an acidulant.

The acidulant is preferably selected from citric acid, acetic acid, lactic acid, gluconic acid, glucono-deltalactone, tartaric acid, propionic acid, glycolic acid, fumaric acid, sorbic acid, malic acid, oxalic acid, ascorbic acid, hydrofluoric acid, hydrochloric acid, hydrobromic acid, hydroiodic acid, sulfuric acid, nitric acid, phosphoric acid, boric acid and combinations thereof.

According to a particularly preferred embodiment, the aqueous flower gel comprises 0.01-40 mM, more preferably 0.05-30 mM and most preferably 0.1-15 mM of citric acid.

Instead or besides acidulant, the aqueous flower gel may suitably contain dissolved metal cations and/or dissolved ammonium cations as the destabilizing agent. These dissolved cations may be provided by adding a water-soluble salt to the smectite clay gel. Preferably, the flower gel comprises 0.5-150 mM, more preferably 1.5-100 mM and most preferably 2.5-70 mM of dissolved cations selected from dissolved metal cations, dissolved ammonium cations and combinations thereof.

In a particularly preferred embodiment, the flower gel contains 0.5-150 mM, more preferably 1.5-100 mM and most preferably 2.5-70 mM of dissolved cations of metals selected from alkali metal, alkaline earth metal, aluminium, bismuth, boron, zinc, manganese, iron, copper, nickel, cobalt and combinations thereof.

Examples of dissolved alkali metal cations that can suitably be employed in the flower gel include dissolved cations of alkali metal selected from sodium, potassium, lithium and combinations thereof. Preferably, the flower gel comprises 5-150 mM, more preferably 10-100 mM and most preferably 17-70 mM of dissolved alkali metal cations.

Examples of dissolved alkaline earth metal cations that may be employed in accordance with the invention include dissolved cations of alkaline earth metal selected from magnesium, calcium and combinations thereof. Preferably, the flower gel comprises 1-50 mM, more preferably 2-25 mM and most preferably 3-10 mM of dissolved alkaline earth metal cation.

Examples of other dissolved metal cations that may be employed in accordance with the invention include water-soluble salts of a metal selected from aluminium, bismuth, boron, zinc, manganese, iron, copper, nickel, cobalt and combinations thereof. Preferably, the flower gel comprises 0.5-50 mM, more preferably 1.5-25 mM and most preferably 2.5-9 mM of dissolved cations of a metal selected from aluminium, bismuth, boron, zinc, manganese, iron, copper, nickel, cobalt and combinations thereof.

The dissolved metal cations that may be employed in accordance with the present invention preferably have been introduced in the form of a water-soluble salt that release the metal cation and a counterion. The flower gel preferably comprises one or more of the following counterions (anions): chloride, bromide, iodide, oxide, hydroxide, cyanide, carbonate, oxalate, nitrate, phosphate, sulfate, sulfite, chlorate, perchlorate, acetate, hydrogen sulfite, hydrogen sulfate, hydrogen phosphate. dihydrogen phosphate, pyrophosphate, thiosulfate, hypochlorite, thiocyanate, cyanide and citrate.

According to a particularly preferred embodiment, the flower gel contains 0.1-150 mM, more preferably 0.5-120 mM, even more preferably 1.5-100 mM and most preferably 2.5-70 mM of dissociated metal salt selected from sodium chloride, potassium chloride, calcium chloride, magnesium chloride and combinations thereof.

The inventors have found that the properties of the flower gel can be further improved by incorporating a surfactant. The surfactant helps to stabilize the aqueous flower gel and enhances water uptake by the cut flowers. Accordingly, in a preferred embodiment, the aqueous flower gel comprises 0.01-1 wt. %, more preferably 0.015-0.5 wt. % and most preferably 0.02-0.3 wt. % of surfactant selected from nonionic surfactant, anionic surfactant, amphoteric surfactant and combinations thereof.

Examples of nonionic surfactants that may be employed in accordance with the invention include alcoholethoxylates, alcohol propoxylates, propoxylated fatty alcohols, alkoxylated fatty acid alkyl esters (e.g. ethoxylated and/or propoxylated fatty acid alkyl esters), alkylphenol ethoxylates, nonylphenol ethoxylates, alkylpolyglycosides, alkoxylated amines, fatty acid monoethanolamides, fatty acid diethanolamides, ethoxylated fatty acid monoethanolamides, propoxylated fatty acid monoethanolamides, polyhydroxyalkyl fatty acid amides, N-acyl N-alkyl derivatives of glucosamine, sorbitan esters and combinations thereof. Most preferably, the nonionic surfactant is polyoxyethylene alkyl ether.

Examples of anionic surfactants that may be employed in accordance with the invention include sulphate and sulphonate surfactants, in particular, linear alkylbenzenesulfonates, branched alkylbenzenesulfonates, phenylalkanesulfonates, alpha-olefinsulfonates, olefin sulfonates, alkene sulfonates, alkane-2,3-diylbis(sulfates), hydroxyalkanesulfonates and disulfonates, alkyl sulfates, fatty alcoholsulfates, primary alcohol sulfates, alcohol ethersulfates, secondary alkanesulfonates, paraffinsulfonates, ester sulfonates, sulfonated fatty acid glycerol esters, alpha-sulfo fatty acid methyl esters, alkyl- or alkenylsuccinic acid, dodecenyl/tetradecenyl succinic acid, fatty acid derivatives of amino acids, diesters and monoesters of sulfo-succinic acid, soap and combinations thereof.

Examples of amphoteric surfactants that may be employed in accordance with the invention include amine oxides and betaines.

According to a particularly preferred embodiment, the aqueous flower gel comprises 0.01-5 wt. %, more preferably 0.015-1.0 wt. %, most preferably 0.02-0.1 wt. % of nonionic surfactant.

The water content of the aqueous flower gel preferably is at least 90 wt. %, more preferably at least 93 wt. % and most preferably at least 95 wt. %.

The container holding the aqueous flower gel is preferably selected from a bag, a wrap, a bucket, a cup, a pot and a vase.

A further aspect of the invention relates to the use of the aforementioned aqueous flower gel as a water-supplying medium for cut flowers or cut plants.

Another aspect of the invention relates to a kit of parts comprising:
  first container comprising a thixotropic aqueous gel comprising 1-4 wt. % of disc-shaped smectite clay nanoparticles having two opposing flat surfaces that are negatively charged and a rim that is positively charged;
  a second container comprising an aqueous liquid comprising 0.001-30 M of one or more destabilizing agents selected from acidulants, dissolved metal cations and dissolved ammonium cations; and/or 0.1-70 wt. % of nutrients.

The smectite clay nanoparticles in the thixotropic aqueous gel preferably are smectite clay particles as described herein before.

The thixotropic aqueous gel in the first container preferably comprises 1.2-3.5 wt. % of the disc-shaped smectite clay nanoparticles, more preferably 1.5-3.0 wt. % of the disc-shaped smectite clay nanoparticles and most preferably 1.8-2.5 wt. % of the disc-shaped smectite clay nanoparticles.

The thixotropic aqueous gel in the first container preferably has a thixotropic index of at least 3, more preferably of at least 5 and most preferably of 6 to 100. Here the "thixotropic index refers to the ratio between the constant viscosity of the gel at 20° C. measured at a low shear rate (10 rpm) and a high shear rate (100 rpm) using a Brookfield CAP 2000+ viscometer and spindle nr. 7.

The thixotropic aqueous gel of the present invention is capable of retaining its original gel-like characteristics after shear thinning. Typically, in the "3 intervals thixotropy test" the thixotropic aqueous gels achieves at least 50% recovery within 60 seconds, more preferably within 20 seconds and most preferably within 10 seconds. This thixotropy test is conducted at 20° C. using a Brookfield CAP 2000+ viscometer and a nr. 7 spindle and comprises measuring the viscosity during three different phases.

First low-shear phase (10 rpm until a constant viscosity is measured)
High-shear phase (100 rpm until a constant viscosity is measured)
Second low-shear phase (10 rpm)

The viscosity measured during the second low-shear phase increases as a function of time due to structural regeneration. The percentage recovery is determined by dividing the viscosity measured at a given time during the second low-shear phase by the viscosity measured during the first low-shear phase.

The gel characteristics of smectite gels are affected by the presence of metal cations. Preferably, the aqueous flower gel contains not more than 200 ppm, more preferably 25-175 ppm and most preferably 50-150 ppm (dissolved) calcium cations.

The one or more components in the aqueous liquid of the second container are preferably selected from acidulants, dissolved metal cations, dissolved ammonium cations and combinations thereof.

In a preferred embodiment of the present invention, the aqueous liquid in the second container has a pH in the range of 0.8 to 5, more preferably in the range of 1 to 4.

The acidulants and the dissolved metal cations preferably are as described herein before in relation to the aqueous flower gel of the present invention.

The aqueous liquid in the second container preferably comprises 0.0015-25 M, more preferably 0.002-15 M and most preferably 0.003-7.0 M of acidulant.

The acidulant that is contained in the aqueous liquid is preferably selected from citric acid, acetic acid, lactic acid, gluconic acid, glucono-deltalactone, tartaric acid, propionic acid, glycolic acid, fumaric acid, sorbic acid, malic acid, oxalic acid, ascorbic acid, hydrofluoric acid, hydrochloric acid, hydrobromic acid, hydroiodic acid, sulfuric acid, nitric acid, phosphoric acid, boric acid and combinations thereof.

According to a particularly preferred embodiment, the aqueous liquid comprises 0.001-3.2 M, more preferably 0.0015-2.6 M and most preferably 0.003-2.1 M of citric acid.

Instead or besides acidulant, the aqueous liquid may suitably contain a dissolved metal cations as the destabilizing agent. Preferably, the aqueous liquid contains 0.005-30 M, more preferably 0.015-25 M and most preferably 0.025-20 M of the dissolved metal cations.

In a particularly preferred embodiment, the aqueous liquid contains 0.005-30 M, more preferably 0.015-25 M and most preferably 0.025-20 M of dissolved cations of metals selected from alkali metal, alkaline earth metal, aluminium, bismuth, boron, zinc, manganese, iron copper, nickel, cobalt and combinations thereof.

Preferably, the dissolved metal cations employed in the aqueous liquid are dissolved metal cations as described herein before.

Examples of plant nutrients that may be used in the aqueous liquid of the second container include nitrogen, phosphorus, silicium and biostimulants. Biostimulants are compounds which enhance plant physiological processes to improve plant vigor, yield, quality and post-harvest shelf life (see Regulation (EC) No. 2016/0084).

The aqueous liquid in the second container preferably contains 0.1-60 wt. %, more preferably 0.5-50 wt. % and most preferably 1-40 wt. % of nutrients.

Examples of cut flower nutrients that may be used in the aqueous liquid of the second container include glucose, sucrose, fructose, maltose and combinations thereof.

The aqueous liquid in the second container preferably contains 1.0-70 wt. %, more preferably 2.0-60 wt. % and most preferably 3.0-50 wt. % of sugars selected from glucose, sucrose, fructose, maltose and combinations thereof.

In accordance with an advantageous embodiment, the thixotropic aqueous gel contains 0.01-1 wt. %, more preferably 0.015-0.5 wt. % and most preferably 0.02-0.3 wt. % of surfactant selected from nonionic surfactant, anionic surfactant, amphoteric surfactant and combinations thereof.

In another advantageous embodiment, the aqueous liquid contains 0.5-40 wt. %, more preferably 1-20 wt. % and most preferably 2-10 wt. % of surfactant selected from nonionic surfactant, anionic surfactant, amphoteric surfactant and combinations thereof.

Preferably, the surfactant employed in the thixotropic aqueous gel and/or the aqueous liquid is a surfactant as described herein before.

The water content of the aqueous liquid in the second container preferably is at least 40 wt. %, more preferably at least 50 wt. % and most preferably at least 60 wt. %.

The first container of the present kit of parts preferably holds 5-5,000 L, more preferably 10-2,000 L, most preferably 100-1,200 L of the thixotropic aqueous gel.

The second container preferably holds 0.05-50 L, more preferably 0.1-30 L, most preferably 1-20 L of the aqueous liquid.

The weight ratio between the amount of thixotropic aqueous gel in the first container and the amount of aqueous liquid in the second container preferably lies in the range of 10:1 to 500:1, more preferably in the range of 20:1 to 400:1 and most preferably in the range of 30:1 to 300:1.

Yet another aspect of the invention relates to a method of preparing a gelled hydration medium, said method comprising:
  providing a thixotropic aqueous gel comprising 1-4 wt. % of disc-shaped smectite clay nanoparticles having two opposing flat surfaces that are negatively charged and a rim that is positively charged;
  providing an aqueous liquid comprising 0.001-30 M of one or more destabilizing agents selected from acidulants, dissolved metal cations and dissolved ammonium cations; and/or 0.1-70 wt. % of nutrients; and
  mixing the thixotropic aqueous gel and the aqueous liquid.

According to a particularly preferred embodiment, the gelled hydration medium produced by the present method is a flower gel as described herein before.

The thixotropic aqueous gel that is employed in the present method preferably is a thixotropic aqueous as comprised in the first container of the kit of parts as described herein before.

Likewise, the aqueous liquid employed in the method preferably is an aqueous liquid as comprised in the second container of the kit or parts as described herein before.

In the present method, the thixotropic aqueous gel and the aqueous liquid are preferably mixed in a weight ratio that lies in the range of 10:1 to 500:1, more preferably in a weight ratio that lies in the range of 20:1 to 400:1 and most preferably in a weight ratio that lies in the range of 30:1 to 300:1.

According to a preferred embodiment, the thixotropic aqueous gel is liquefied by shear thinning before it is mixed with the aqueous liquid.

In an advantageous embodiment of the present invention, the gelled hydration medium is introduced into a container together with the stems of cut flowers.

In another advantageous embodiment, the gelled hydration medium is combined with soil and/or growing medium and subsequently plants are planted into the mixture of gelled hydration medium and soil and/or growing medium. Alternatively, the gelled hydration medium is added to a container containing soil and/or growing medium and a plant that is rooted into said soil and/or growing medium.

The invention is further illustrated by the following non-limiting examples.

EXAMPLES

Example 1

Tests were carried out in which the stems of cut roses were immersed in flower gels of different compositions and in which the ensuing effect on attractive flower life was determined.

The compositions of the flower gels tested are shown in Table 1.

TABLE 1

| | Wt. % | | | | | | |
|---|---|---|---|---|---|---|---|
| | 1 | 2 | 3 | 4 | 5 | 6 | 7 |
| Smectic clay [1] | | | | 2 | | | |
| Polyoxyethylene alkyl ether | | | | 0.082 | | | |

TABLE 1-continued

| | Wt. % | | | | | | |
|---|---|---|---|---|---|---|---|
| | 1 | 2 | 3 | 4 | 5 | 6 | 7 |
| Citric acid (50% w/v solution) | 0.000 | 0.025 | 0.050 | 0.063 | 0.075 | 0.088 | 0.100 |
| Tap water [2] | remainder | | | | | | |

[1] phyllosilicate of idealized formula $Na^+_{0.7}[(Si_8Mg_{5.5}Li_{0.3})O_{20}(OH)_4]^-_{0.7}$
[2] containing 65.7 ppm $Ca^{2+}$ The different flower gels were produced by separately preparing a thixotropic smectic clay gel and 7 different aqueous liquids. The thixotropic smectic clay gel was prepared by mixing 20 grams of smectic clay clay with 970 grams of tap water. The aqueous liquids were prepared by mixing the remaining ingredients with the rest of the tap water. Next, the flower gels were prepared by stirring the thixotropic smectic clay gel with Silverson L4RT High Shear Mixer to liquefy the gel. Then, the aqueous liquid was added, followed by 5 minutes of mixing.

The rheological properties of the thixotropic smectic clay gel were determined 48 hours after preparation, using a Brookfield CAP 2000+ viscometer as described herein before. The results are shown in Table 2

TABLE 2

| Viscosity at 10 rpm (mPa · s) | 944 |
|---|---|
| Viscosity at 100 rpm (mPa · s) | 95.4 |
| Thixotropic index | 9.90 |
| Recovery time in 3ITT (sec.) | 6 |

The viscosities of the different flower gels were measured (Brookfield CAP 2000+ viscometer, 20° C., 50-150 rpm, spindle 7) 5 days after preparation.

The viscosities of the different flower gels were measured on a Brookfield CAP 2000+, using spindle nr. 7. The thixotropic behaviour of the flower gels was checked by doing an up and down speed ramps curves. If a hysteretic loop is observed, the sample has a thixotropic behavior. The up and down ramps were performed at 20° C., with a speed rate of 50 to 150 rpm. From the aforementioned curves the viscosity was calculated with the Power law model. The results are shown in Table 3.

TABLE 3

| | 1 | 2 | 3 | 4 | 5 | 6 | 7 |
|---|---|---|---|---|---|---|---|
| Viscosity (mPa · s) | 47,625 | 43,231 | 13,308 | 8,703 | 3,927 | 2,133 | 1,670 |

Half a liter of each of the flower gels was dosed onto a plastic foil which was subsequently wrapped around the stems of a bunch of 12 freshly cut roses (6 Rosa 'Athena' and 6 Rosa "Ace Pink"). Two wrapped bunches were prepared in this way for each flower gel (n=2).

The wrapped bunches were inserted into vases and were kept at 20° C. and RH 60%. During this period the flowers were alternatingly exposed to 12 hours of dark conditions and 12 hours of artificial light (1000 Lux). During this period the quality of the flowers was monitored by an expert panel using the following criteria:
Average number of days until rejection
Day when first flower from bunch is rejected
Day when 50% of the flowers in the bunch are rejected
Percentage flowers that is still OK on day 7

The results for the smectic clay-based flower gels are shown in Table 4.

TABLE 4

| | Days until rejection | | | | | | |
|---|---|---|---|---|---|---|---|
| | 1 | 2 | 3 | 4 | 5 | 6 | 7 |
| Rosa 'Athena' | 6.8 | 8.0 | 8.8 | 10.3 | 10.8 | 10.7 | 10.6 |
| Rosa 'Ace Pink' | 6.2 | 7.9 | 8.8 | 9.8 | 9.8 | 10.9 | 10.2 |
| Roses average | 6.5 | 8.0 | 8.8 | 10.0 | 10.3 | 10.8 | 10.4 |
| First flower rejected (days) | 3.5 | 6.0 | 7.0 | 7.5 | 8.0 | 7.5 | 9.0 |
| 50% rejected (days) | 7.0 | 8.0 | 9.0 | 10.0 | 10.0 | 11.3 | 10.5 |
| Flowers OK on day 7 (%) | 66.7 | 95.8 | 95.8 | 100.0 | 100.0 | 100.0 | 100.0 |

Example 2

Tests were carried out in which the stems of cut roses were immersed in flower gels of different compositions and in which the ensuing effect on attractive flower life was determined.

The compositions of the flower gels tested are shown in Table 5.

TABLE 5

| | Wt. % | | | | |
|---|---|---|---|---|---|
| | 1 | 2 | 3 | 4 | 5 |
| Smectic clay [1] | 2 | | | | |
| Polyoxyethylene alkyl ether | 0.082 | | | | |
| Hydrochloric acid (37% w/v solution) | 0.009 | | | | |
| Sodium chloride | 0.040 | 0.030 | 0.020 | 0.012 | 0.000 |
| Tap water[2] | remainder | | | | |

[1] phyllosilicate of idealized formula $Na^+_{0.7}[(Si_8Mg_{5.5}Li_{0.3})O_{20}(OH)_4]^-_{0.7}$
[2] containing 65.7 ppm $Ca^{2+}$ The different flower gels were produced as described in Example 1. Sodium chloride was added in the form of a 40% (w/v) solution.

The viscosity was measured as described in Example 1, 4 days after production. The results are shown in Table 6.

TABLE 6

| | 1 | 2 | 3 | 4 | 5 |
|---|---|---|---|---|---|
| Viscosity (mPa · s) | 1,735 | 5,679 | 21,958 | 31,233 | 33,427 |

A flower test was carried as described in Example 1. The results of the test are summarized in Table 7.

TABLE 7

| | Days until rejection | | | | |
|---|---|---|---|---|---|
| | 1 | 2 | 3 | 4 | 5 |
| Rosa 'Kiwi' | 12.4 | 11.3 | 8.7 | 10.1 | 9.7 |
| Rosa 'Madame Red' | 11.9 | 10.8 | 9.6 | 8.9 | 8.8 |
| Rosa 'Ace Pink' | 13.8 | 12.4 | 12.0 | 10.4 | 10.0 |
| Roses average | 12.7 | 11.5 | 10.1 | 9.8 | 9.5 |

Example 3

Flower gels were prepared using a water soluble metal salt (NaCl) as a destabilizing agent.

The compositions of the flower gels tested are shown in Table 8.

TABLE 8

| | Wt. % | | | | | | |
|---|---|---|---|---|---|---|---|
| | 1 | 2 | 3 | 4 | 5 | 6 | 7 |
| Smectic clay [1] | | | | 2 | | | |
| Polyoxyethylene alkyl ether | | | | 0.082 | | | |
| Sodium chloride | 0.000 | 0.045 | 0.075 | 0.103 | 0.222 | 0.333 | 0.350 |
| Tap water [2] | | | | remainder | | | |

[1] phyllosilicate of idealized formula $Na^+_{0.7}[(Si_8Mg_{5.5}Li_{0.3})O_{20}(OH)_4]^-_{0.7}$
[2] containing 65.7 ppm $Ca^{2+}$ The different flower gels were produced as described in Example 1. Sodium chloride was added in the form of a 40% (w/v) solution. The viscosity of the flower gels was measured as described in Example 1, 2 days after production. The results are shown in Table 9.

TABLE 9

| | 1 | 2 | 3 | 4 | 5 | 6 | 7 |
|---|---|---|---|---|---|---|---|
| Viscosity (mPa · s) | 39,698 | 35,252 | 28,007 | 9,819 | 3,172 | 1,934 | 671 |

Example 4

Flower gels were prepared using a water soluble metal salt ($CaCl_2$)) as a destabilizing agent.

The compositions of the flower gels tested are shown in Table 10.

TABLE 10

| | Wt. % | | | | |
|---|---|---|---|---|---|
| | 1 | 2 | 3 | 4 | 5 |
| Smectic clay [1] | | | 2 | | |
| Polyoxyethylene alkyl ether | | | 0.082 | | |
| Calcium chloride | 0.000 | 0.012 | 0.018 | 0.021 | 0.024 |
| Tap water [2] | | | remainder | | |

[1] phyllosilicate of idealized formula $Na^+_{0.7}[(Si_8Mg_{5.5}Li_{0.3})O_{20}(OH)_4]^-_{0.7}$
[2] containing 65.7 ppm $Ca^{2+}$ The different flower gels were produced as described in Example 1. Calcium chloride was added in the form of a 15% (w/v) solution. The viscosity of the flower gels was measured as described in Example 1, 2 days after production. The results are shown in Table 11.

TABLE 11

| | 1 | 2 | 3 | 4 | 5 |
|---|---|---|---|---|---|
| Viscosity (mPa · s) | 39,698 | 31,003 | 24,527 | 12,838 | 2,500 |

Example 5

Flower gels were prepared using citric acid as a destabilizing agent (without surfactant).

The compositions of the flower gels tested are shown in Table 12.

TABLE 12

| | Wt. % | | | | |
|---|---|---|---|---|---|
| | 1 | 2 | 3 | 4 | 5 |
| Smectic clay [1] | | | 2 | | |
| Citric acid (50% w/v solution) | 0.000 | 0.050 | 0.100 | 0.150 | 0.200 |
| Tap water [2] | | | remainder | | |

[1] phyllosilicate of idealized formula $Na^+_{0.7}[(Si_8Mg_{5.5}Li_{0.3})O_{20}(OH)_4]^-_{0.7}$
[2] containing 65.7 ppm $Ca^{2+}$ The different flower gels were produced as described in Example 1. The viscosity of the flower gels was measured as described in Example 1, 2 days after production. The results are shown in Table 13.

TABLE 13

| | 1 | 2 | 3 | 4 | 5 |
|---|---|---|---|---|---|
| Viscosity (mPa · s) | 88,587 | 26,320 | 14,069 | 5,697 | 3,730 |

Example 6

Flower gels were prepared using an ammonium salt ($NH_4Cl$) as a destabilizing agent (without surfactant).

The compositions of the flower gels tested are shown in Table 14.

TABLE 14

| | Wt. % | | | | |
|---|---|---|---|---|---|
| | 1 | 2 | 3 | 4 | 5 |
| Smectic clay [1] | | | 2 | | |
| $NH_4Cl$ (25% w/v solution) | 0.000 | 0.050 | 0.100 | 0.150 | 0.200 |
| Tap water [2] | | | remainder | | |

[1] phyllosilicate of idealized formula $Na^+_{0.7}[(Si_8Mg_{5.5}Li_{0.3})O_{20}(OH)_4]^-_{0.7}$
[2] containing 65.7 ppm $Ca^{2+}$ The different flower gels were produced as described in Example 1. The viscosity of the flower gels was measured as described in Example 1, 2 days after production. The results as shown in Table 15.

TABLE 15

| | 1 | 2 | 3 | 4 | 5 |
|---|---|---|---|---|---|
| Viscosity (mPa · s) | 88,587 | 41,806 | 37,273 | 10,251 | 3,429 |

Example 7

Flower gels were prepared using Bentonite as gelling agent.

The compositions of the flower gels tested are shown in Table 16.

TABLE 16

| | Wt. % | | | | | | | |
|---|---|---|---|---|---|---|---|---|
| | 1 | 2 | 3 | 4 | 5 | 6 | 7 | 8 |
| Smectic clay [1] | | | | 4 | | | | |
| MgO | | | | 0.5 | | | | |

TABLE 16-continued

| | Wt. % | | | | | | | |
|---|---|---|---|---|---|---|---|---|
| | 1 | 2 | 3 | 4 | 5 | 6 | 7 | 8 |
| Citric acid (50% w/v solution) | 0.0 | 0.8 | 1.4 | 2.0 | 3.0 | 4.0 | 5.0 | 6.0 |
| RO water | | | | remainder | | | | |

[1] phyllosilicate of idealized formula $Na_{0.2}Ca_{0.1}Al_2Si_4O_{10}(OH)_2(H_2O)_{10}$ The different flower gels were produced by separately preparing a thixotropic smectic clay gel and aqueous liquid.

The thixotropic smectic clay gel was prepared by mixing 40 grams of smectic clay with 955 grams of RO water. After homogenization, 5 grams of MgO was added. The rheological properties of the thixotropic smectic clay gel were determined as described in Example 1. The results are shown in Table 17.

TABLE 17

| | |
|---|---|
| Viscosity at 10 rpm (mPa · s) | 12,780 |
| Viscosity at 100 rpm (mPa · s) | 1,692 |
| Thixotropic index | 7.55 |
| Recovery time in 3ITT (sec.) | 2 |

Next, the thixotropic smectic clay gel was liquefied by stirring the gel with a Silverson L4RT High Shear Mixer, and flower gels were prepare by adding aqueous liquid (water or citric acid solution), followed by 5 more minutes of stirring. The viscosities of the different flower gels were measured as described in Example 1, 2 days after production. The results are shown in Table 18.

TABLE 18

| | 1 | 2 | 3 | 4 | 5 | 6 | 7 | 8 |
|---|---|---|---|---|---|---|---|---|
| Viscosity (mPa · s) | 312,316 | 194,327 | 44,397 | 31,002 | 23,763 | 20,376 | 19,960 | 10,254 |

Example 8

Flower gels were prepared using Saponite as gelling agent and aluminium sulphate as destabilizing agent.

The compositions of the flower gels tested are shown in Table 19.

TABLE 19

| | Wt. % | | | | |
|---|---|---|---|---|---|
| | 1 | 2 | 3 | 4 | 5 |
| Smectic clay [1] | | | 3 | | |
| $Al_2(SO_4)_3$ (8.2% w/v solution) | 0.0 | 1.06 | 1.59 | 2.12 | 2.66 |
| RO water | | | remainder | | |

[1] phyllosilicate of idealized formula $Na_{0.33}Mg_3(Si_{3.67}Al_{0.33})O_{10}(OH)_2$ The different flower gels were produced by separately preparing a thixotropic smectic clay gel and aqueous liquid.

The thixotropic smectic clay gel was prepared by mixing 30 grams of smectic clay with 970 grams of RO water. The rheological properties of the thixotropic smectic clay gel were determined as described in Example 1. The results are shown in Table 20.

TABLE 20

| | |
|---|---|
| Viscosity at 10 rpm (mPa · s) | 2,158 |
| Viscosity at 100 rpm (mPa · s) | 257 |
| Thixotropic index | 8.4 |
| Recovery time in 3ITT (sec.) | 5 |

Next, the thixotropic smectic clay gel was liquefied by stirring the gel with a Silverson L4RT High Shear Mixer, and flower gels were prepare by adding aqueous liquid (water or aluminium sulphate solution), followed by 5 more minutes of stirring The viscosities of the different flower gels were measured as described in Example 1, 2 hours after production. The results are shown in Table 21.

TABLE 21

| | 1 | 2 | 3 | 4 | 5 |
|---|---|---|---|---|---|
| Viscosity (mPa · s) | 71,686 | 12,702 | 7,741 | 4,936 | 2,390 |

Example 9

Tests were carried out in which the stems of cut roses were immersed in flower gels of different compositions and in which the ensuing effect on attractive flower life was determined.

The compositions of the flower gels tested are shown in Table 22.

TABLE 22

| | Wt. % | | | | |
|---|---|---|---|---|---|
| | 1 | 2 | 3 | 4 | 5 |
| Smectic clay [1] | | | 2 | | |
| Polyoxyethylene alkyl ether | 0.000 | 0.082 | | 0.000 | |
| Alkyl sulfate | | 0.000 | 0.082 | | 0.000 |
| Sorbitan ester | | | 0.000 | 0.082 | 0.000 |
| Betaine | | | 0.000 | | 0.082 |
| Citric acid (50% w/v solution) | | | 0.077 | | |
| Tap water [2] | | | remainder | | |

[1] phyllosilicate of idealized formula $Na^+_{0.7}[(Si_8Mg_{5.5}Li_{0.3})O_{20}(OH)_4]^-_{0.7}$
[2] containing 65.7 ppm $Ca^{2+}$ The different flower gels were produced as described in Example 1. A flower test was carried as described in Example 1. The results of the test are summarized in Table 23.

TABLE 23

| | Days until rejection | | | | |
|---|---|---|---|---|---|
| | 1 | 2 | 3 | 4 | 5 |
| Rosa 'Tacazzi' | 3.0 | 3.4 | 3.1 | 4.0 | 3.7 |
| Rosa 'Athena' | 4.9 | 5.7 | 5.6 | 5.5 | 5.8 |
| Roses average | 4.0 | 4.6 | 4.4 | 4.8 | 4.8 |

Example 10

Flower gels were prepared using different surfactants. The compositions of the flower gels tested are shown in Table 24.

TABLE 24

| | Wt. % | | | | | |
|---|---|---|---|---|---|---|
| | 1 | 2 | 3 | 4 | 5 | 6 |
| Smectic clay [1] | 2 | | | | | |
| Alkyl sulfate | 0.082 | 0.082 | 0.000 | 0.000 | 0.000 | 0.000 |
| Sorbitan ester | 0.000 | 0.000 | 0.082 | 0.082 | 0.000 | 0.000 |
| Betaine | 0.000 | 0.000 | 0.000 | 0.000 | 0.082 | 0.082 |
| Citric acid (50% w/v solution) | 0.000 | 0.077 | 0.000 | 0.077 | 0.000 | 0.077 |
| Tap water [2] | remainder | | | | | |

[1] phyllosilicate of idealized formula $Na^+_{0.7}[(Si_8Mg_{5.5}Li_{0.3})O_{20}(OH)_4]^-_{0.7}$
[2] containing 65.7 ppm $Ca^{2+}$ The different flower gels were produced as described in Example 1. The viscosities of the flower gels were measured as described in Example 1, 2 days after production. The results are shown in Table 25.

TABLE 25

| | 1 | 2 | 3 | 4 | 5 | 6 |
|---|---|---|---|---|---|---|
| Viscosity (mPa · s) | 29,171 | 7,306 | 102,194 | 23,734 | 72,868 | 10,259 |

The invention claimed is:

1. A flower shipment kit, comprising:
 (a) a container holding an aqueous flower gel; and
 (b) one or more cut flowers having stems immersed in the aqueous flower gel,
 wherein the aqueous flower gel comprises:
  (i) 1-4 wt. % of disc-shaped smectite clay nanoparticles having two opposing flat surfaces that are negatively charged and a rim that is positively charged, and
  (ii) 0.01-250 mM of one or more gel destabilizing agents selected from acidulants, dissolved metal cations and dissolved ammonium cations.

2. The flower shipment kit according to claim 1, wherein the smectic clay is a natural or synthetic phyllosilicate of formula Na+0.7[(Si8Mg5.5Li0.3)O20(OH)4]−0.7.

3. The flower shipment kit according to claim 1, wherein the aqueous flower gel has a pH in the range of 6 to 9.

4. The flower shipment kit according to claim 1, wherein the aqueous flower gel comprises 0.1-100 mM of acidulant.

5. The flower shipment kit according to claim 1, wherein the aqueous flower gel comprises 0.5-150 mM of dissolved cations of metals selected from alkali metal, alkaline earth metal, aluminium, bismuth, boron, zinc, manganese, iron, copper, nickel, cobalt and combinations thereof.

6. The flower shipment kit according to claim 1, wherein the aqueous flower gel further comprises 0.01-1 wt. % of surfactant selected from nonionic surfactant, anionic surfactant, amphoteric surfactant and combinations thereof.

7. The flower shipment kit according to claim 1, wherein the aqueous flower gel has a water content of at least 90 wt. %.

8. A kit of parts comprising:
 (a) a first container comprising a thixotropic aqueous gel comprising 1-4 wt. % of disc-shaped smectite clay nanoparticles having two opposing flat surfaces that are negatively charged and a rim that is positively charged; and
 (b) a second container comprising an aqueous liquid comprising 0.001-30 M of one or more destabilizing agents selected from acidulants, dissolved metal cations and dissolved ammonium cations.

9. The kit of parts according to claim 8, wherein the aqueous liquid has a pH in the range of 0.8 to 5.

10. The kit of parts according to claim 8, wherein the aqueous liquid comprises 0.0015-25 M of acidulant selected from citric acid, acetic acid, lactic acid, gluconic acid, glucono-deltalactone, tartaric acid, propionic acid, glycolic acid, fumaric acid, sorbic acid, malic acid, oxalic acid, ascorbic acid, hydrofluoric acid, hydrochloric acid, hydrobromic acid, hydroiodic acid, sulfuric acid, nitric acid, phosphoric acid, boric acid and combinations thereof.

11. The kit of parts according to claim 8, wherein the aqueous liquid contains 0.005-30 M of dissolved cations of metals selected from alkali metal, alkaline earth metal, aluminium, bismuth, boron and combinations thereof.

12. The kit of parts according to claim 8, wherein the thixotropic aqueous gel contains 0.01-1 wt. % of surfactant selected from nonionic surfactant, anionic surfactant, amphoteric surfactant and combinations thereof.

13. The kit of parts according to claim 8, wherein thixotropic aqueous gel has a thixotropic index of at least 3.

14. A method of preparing a gelled hydration medium, the method comprising mixing:
 (a) a thixotropic aqueous gel comprising 1-4 wt. % of disc-shaped smectite clay nanoparticles having two opposing flat surfaces that are negatively charged and a rim that is positively charged; and
 (b) an aqueous liquid comprising 0.001-30 M of one or more destabilizing agents selected from acidulants, dissolved metal cations and dissolved ammonium cations.

* * * * *